March 20, 1945.  A. SCHADE ET AL  2,371,925
AUTOMATIC PHOTOPRINTING DEVICE
Filed May 27, 1941   2 Sheets-Sheet 2

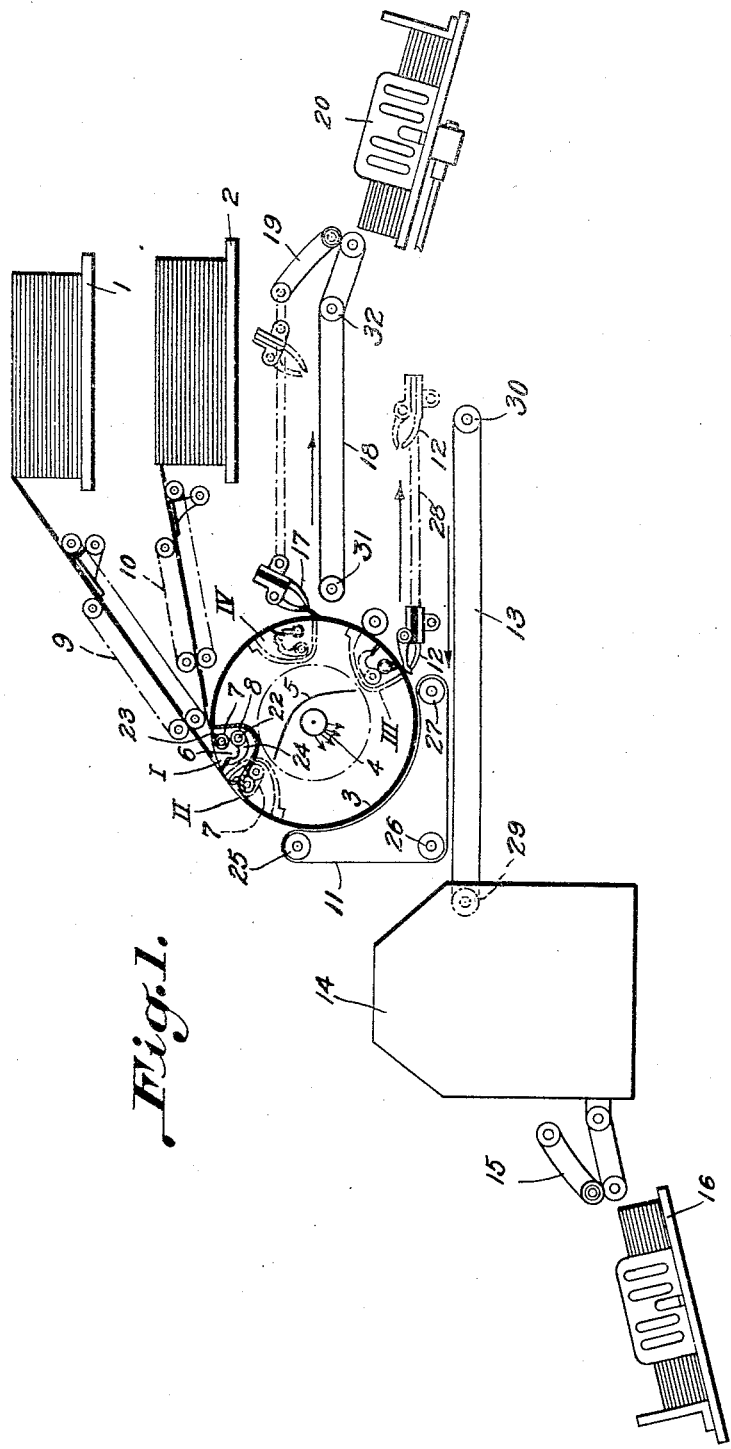

Inventors
Arthur Schade
Josef Horn

By  *[signature]*
Attorney.

Patented Mar. 20, 1945

2,371,925

UNITED STATES PATENT OFFICE 2,371,925

AUTOMATIC PHOTOPRINTING DEVICE

Arthur Schade and Josef Horn, Wiesbaden-Biebrich, Germany; vested in the Alien Property Custodian Application May 27, 1941, Serial No. 395,422
In Germany May 27, 1940

4 Claims. (Cl. 95—77.5)

A serious drawback of the exposure devices and of the combined exposure and developing devices generally used for preparing photoprints exists as each original to be copied and each sheet of photoprinting material, respectively, must be separately supplied by hand to the exposure device. This supply must be carried out very carefully and requires great skill. Moreover, the known devices have the further disadvantage that the originals and the photoprints after the exposure and the development, respectively, are delivered rather irregularly to the collecting troughs so that they must be sorted later. The known devices, therefore, require a large staff of operators whereby the working process is rendered very expensive.

The present invention concerns a photoprinting device which by automatic operation avoids the above mentioned drawbacks. The photoprinting device which is the object of the present invention and which advantageously is constructed so as to form a combined exposure and developing device may be fed from a whole pile of originals as well as from a pile of photoprinting paper. The device works from these piles automatically and copies one original after the other. A preferred type of the new device is constructed so that the copies and the finished photoprints after exposure and development, respectively, are delivered in two piles in exactly the same order in which the pile of originals was supplied to the device but reversely positioned vertically in their piles. Such devices need only a very small attendance. Several of these machines can be controlled by only one person whereas each of the machines hitherto known required one or even several operators. It is obvious that the new device is of great importance particularly in case a set of drawings which belong together, which refer for instance to a certain machine, and which are arranged in a definite order are to be copied several times and to be obtained again in the form of piles in the same order. Such tasks have often to be accomplished in technical offices.

The photoprinting device according to the present invention comprises an exposure-cylinder capable of being rotated and is characterized by two sheet feeding devices of a type used in rotary printing machines, which feed the exposure cylinder with the originals and the photoprinting material from two piles of these materials disposed at two different levels. The sheet feeding devices are arranged and coupled with the motive mechanism of the exposure cylinder in such a manner that they first feed the original automatically to a predetermined point on the revolving cylinder and that, after the cylinder has revolved somewhat further, they conduct the photoprinting material to the same point on the cylinder. At the said point on the cylinder, the original and the photoprinting material, respectively, are held at their fore-edges by a double claw, or a device of similar action, which also works automatically and is coupled with the motive mechanism of the cylinder. The double claw is constructed so that with one of its holding devices it holds the original and with the other it holds the photoprinting material and, after the exposure, releases both sheets one after the other. This operation is repeated at the next revolution of the cylinder.

Advantageously a conveyor device is provided which carries the original, released by the double claw, to an ejector from which it is delivered to a stack or pile supporting means. In a corresponding manner the photoprinting material, released by the double claw, is carried by another conveyor device to an ejector which, likewise, delivers it to a stack or pile supporting means. Before arriving at the ejector, the photoprinting material preferably passes through a developing device.

Fig. 1 is a somewhat diagrammatic illustration of a mechanism embodying the invention.

Figure 3:
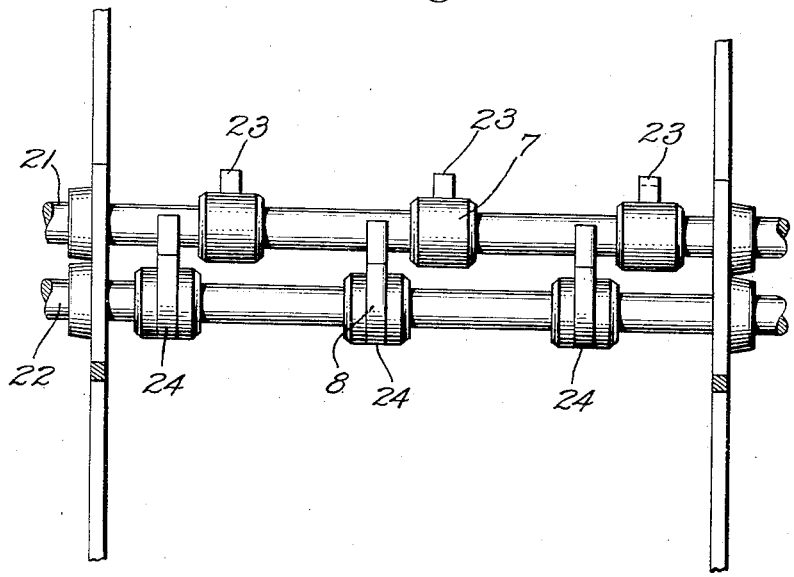
Fig. 3 is an elevation of the claw devices located within the cylinder recess.

Fig. 1 of the annexed drawings diagrammatically represents the device which is the object of the present invention. 1 is a table on which the light-sensitive paper may be placed in the form of a pile. 2 is a second table on which the originals to be copied may be placed in the form of a pile of regular order. 3 is an exposure-cylinder capable of being rotated and having inserted curved glass panes. Within the cylinder there are mounted a source of light 4 and the reflector 5. Preferably these two elements are stationary. On the cylinder a double claw 6 is mounted which is represented in the drawings, in its four working phases (phase I in full lines, phases II–IV in dotted lines). This double claw comprises two movable holding devices 7 and 8, the first of which serves to hold the originals at the exposure cylinder and the latter of which serves to hold the photoprinting material. 9 and 10 are two sheet-feeding devices of known kind which convey the light-sensitive paper and the originals to the exposure cylinder. The two feeding devices are arranged so that, supposing the cylinder to be stopped, they would deliver the prints and the originals, respectively, to two different points along the circumference of the cylinder which are, however, rather near each other. 11 is a conveying belt travelling over several rollers 25, 26 and 27 which, during the exposure, firmly presses the original and the light-sensitive paper against the exposure cylinder. 12 is a withdrawing claw, likewise shown in two operative phases (phase I in full lines, phase II in dotted lines) and which serves to lead the exposed photoprinting papers to the endless conveyer 13 which travels round rollers 29 and 30. 28 is a chain on which the said claw is mounted. 14 is the developing device. Since such devices are generally known, the device is not fully illustrated in the drawings. In the case diazo photoprinting papers are used, for instance a device for developing photographic prints by means of ammonia of the kind described in U. S. Patent No. 2,075,306 may be used. 15 is an ejector of known kind which leads the prints emerging from the developing device to the stack support 16 which is also known as such. 17 is another claw, shown in two operative phases, which draws the original, after exposure, to the conveying belt 18 travelling round rollers 31 and 32 from where it is conducted by ejector 19 to the stack support 20.

The different members of the machine which have been mentioned and their driving means which have not been shown are coupled by means of cam discs and other suitable elements in such a manner—known from the construction of printing and like machines—that they co-act as follows:

When the exposure cylinder 3 is revolving and claw 6 whose two holding devices are at first open has been brought into position I an original is conducted by feeding-device 10 to the cylinder. This original is seized at its fore-edge by the holding device 7 of the claw which closes. As soon as the exposure cylinder has arrived at position II, a photoprinting paper is led to the cylinder by feeding device 9. This paper is seized by the holding device 8 of the claw. During the further revolution of the cylinder the copying material is pressed against the exposure cylinder by means of conveying belt 11 and the exposure takes place. When the claw has arrived at position III, the holding device 8 opens again so that the photoprinting paper is released. It is then seized by withdrawing claw 12. Since the claw 12 moves to the position which is drawn in dotted lines and then opens, the photoprinting material is led to conveying belt 13 which moves in the direction indicated by the arrow and carries the print to the developing device 14. After having passed therethrough, the paper is delivered by ejector 15 to stack support 16. When the exposure cylinder has revolved further and the double claw has taken the position IV, holding device 7 also opens and the original is released. By means of withdrawing claw 17, conveying belt 18 and ejector 19 it is conducted to stapler 20. In this way it is possible to obtain from a stack of originals arranged in a certain order a stack of prints arranged in the same order. At the same time, the originals are returned in the form of a pile of regular order so that, if desired—in case several prints are to be made from each original—the whole stack can be placed again on table 2 without being sorted prior thereto.

Figure 2:
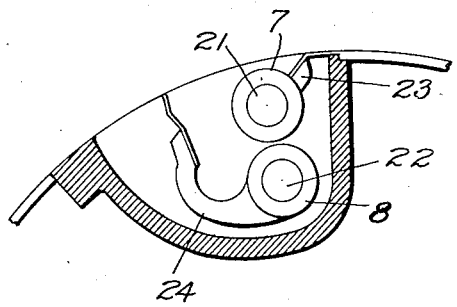
Fig. 2 is a sectional view through the recess in the glass cylinder.

Fig. 2 diagrammatically represents the double claw which consists of two movable holding devices 7 and 8 arranged in a trough or recess of the exposure cylinder. Each of these devices consists of a shaft (21 and 22) on which fingers 23 and 24 are arranged which end in resilient sheet metal strips. According to the position of the shafts the sheets of paper supplied are held by the devices (position of device 7 as drawn) or released by the devices (position of the device 8 as drawn).

The holding device 7 retains the original against the cooperating edge of the cylinder and recess, while the print paper is held by pressure between the flexible metal extension to element 8 and the edge of the cylinder and recess.

We claim:

1. In a photoprinting machine comprising a rotatable exposure cylinder provided with a longitudinal recess, driving means for said cylinder, a table for original prints, a table for light-sensitive printing material, means for conducting said original prints and said light-sensitive printing material from said tables to said cylinder and means for pressing said prints and said material against the surface of said cylinder while said prints and said material are exposed to a source of light within the cylinder, the improvement which comprises providing claw means mounted within said longitudinal recess in the periphery of said exposure cylinder positively and individually to grip the leading edges of first the prints and then the printing material as they are conducted to said cylinder, and means for successively opening the claw means to release said printing material and said prints from said claw means after said cylinder rotates through predetermined angles.

2. In a photoprinting machine comprising a rotatable exposure cylinder provided with a longitudinal recess, driving means for said cylinder, a table for original prints, a table for light-sensitive printing material, means for conducting said original prints and said light-sensitive printing material from said tables to said cylinder and means for pressing said prints and said material against the surface of said cylinder while said prints and said material are exposed to a source of light within the cylinder, the improvement which comprises providing two sets of claw means mounted within said longitudinal recess in the periphery of said exposure cylinder, one set to grip the leading edges of said prints adjacent the peripheral surface of said exposure cylinder, the other set to grip the leading edges of said printing material along a line closely parallel to the leading edges of said prints so that said printing material overlies said prints, means for releasing said printing material from the last named set of claw means and means for subsequently releasing said prints from the first named set of claw means.

3. In a photoprinting machine comprising a rotatable, transparent cylinder provided with a longitudinal recess, a source of light within said cylinder, driving means for said cylinder, a table for sheets of original prints, a table for sheets of light-sensitive printing material, means for conducting a sheet of an original print and a sheet of printing material from said tables to a point on the peripheral surface of the cylinder adjacent the recess therein, the original print being between the cylinder and the printing material, the improvement which comprises separate and independently acting claw means mounted within said longitudinal recess of said cylinder, one claw means operating to grip the leading edge of said original print and the other claw means operating to grip the leading edge of said light-sensitive printing material, so that the leading edges of both sheets will be fixed along approximately the same line, means operating to release the grip of the last named claw means from the leading edge of said printing material after exposure thereof to the source of light and before the cylinder has made a complete revolution and means operating subsequently to release the grip of the first named claw means from the leading edge of the original print, said photoprinting machine furthermore being provided with an endless belt to press said sheets against said cylinder, said belt being in relative stationary contact with said rotating cylinder between the point at which said sheets are gripped by said claw means and the point at which the light-sensitive printing material is released by said claw means.

4. In a photoprinting machine comprising a rotatable, transparent cylinder provided with a longitudinal recess, a source of light within said cylinder, driving means for said cylinder, a table for sheets of original prints, a table for sheets of light-sensitive printing material, means for conducting a sheet of an original print and a sheet of printing material from said tables to a point on the peripheral surface of the cylinder adjacent the recess therein, the original print being between the cylinder and the printing material, the improvement which comprises separate and independently acting claw means mounted within said longitudinal recess of said cylinder, one claw means operating to grip the leading edge of said original print and the other claw means operating to grip the leading edge of said light-sensitive printing material, so that the leading edges of both sheets will be fixed along approximately the same line, means operating to release the grip of the last named claw means from the leading edge of said printing material after exposure thereof to the source of light and before the cylinder has made a complete revolution and means operating subsequently to release the grip of the first named claw means from the leading edge of the original print, means cooperating with said first named claw means for seizing and depositing the original print after its release from said claw means and means cooperating with said second named claw means for seizing and depositing the exposed printing material after its release from said claw means, said photoprinting machine furthermore being provided with an endless belt to press said sheets against said cylinder, said belt being in relative stationary contact with said rotating cylinder between the point at which said sheets are gripped by said claw means and the point at which the light-sensitive printing material is released by said claw means.

ARTHUR SCHADE.
JOSEF HORN.